Feb. 4, 1936.  S. R. KOONS  2,029,429
ATTACHABLE HANDLE FOR PAPER CUPS
Filed Aug. 25, 1933
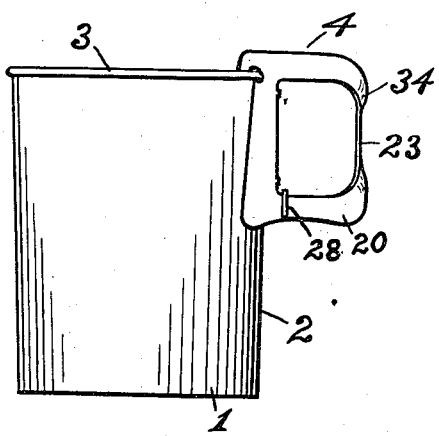
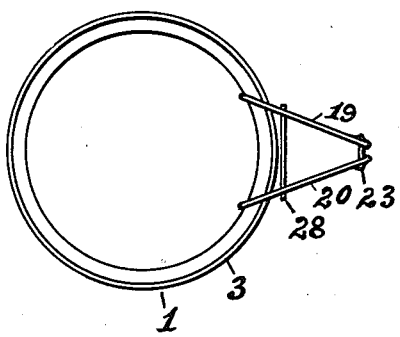
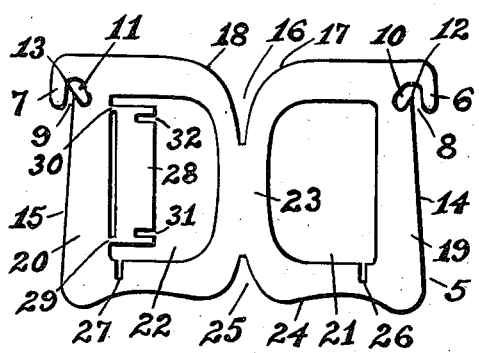
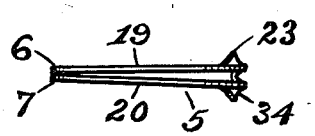
Inventor
Sydney R. Koons
By G. H. Dunstan,
his Attorney Patented Feb. 4, 1936

2,029,429

UNITED STATES PATENT OFFICE 2,029,429

ATTACHABLE HANDLE FOR PAPER CUPS

Sydney R. Koons, Cleveland, Ohio

Application August 25, 1933, Serial No. 686,755

4 Claims. (Cl. 16—114)

This invention relates to attachable handles for paper cups and similar receptacles, and has for its principle object to provide a handle for paper cups, which is inexpensive to manufacture and may be quickly and easily attached to a cup and the like.

Another object of the invention is to provide an attachable handle which may be made of fibre or similar material, and when attached to a cup will hold securely thereto and serve to hold the cup rigidly when in use.

A further object of the invention is to provide an attachable handle of the above character, which permits the receptacle and handle to be packed unattached or separately for saving space but be capable of convenient attachment.

With the above and other objects in view, the invention will be hereinafter fully described with reference to the accompanying drawing, and the novel features thereof will be distinctly pointed out in the appended claims.

Figure 1 is a side elevation of a paper cup having a handle constructed in accordance with my invention attached thereto, Fig. 2 is a plan view of Fig. 1, Fig. 3 is a face view of the handle as stamped from a piece of fibre, and Fig. 4 is plan or top edge view of Fig. 3 when sides of the handle are compressed together for attachment to the cup.

Referring to the drawing, 1 represents an ordinary paper cup constructed in circular form with inclined sides 2 and having an annular turned over or rolled flanged rim 3. In using such a cup for coffee or other hot drinks, it is uncomfortable to hold the cup in the hand. My invention consists in providing the attachable handle now to be described.

This handle, designated by 4, is preferably stamped or cut from sheet fibre, though other resilient and suitable material may be used and consists of a single flat piece indicated by 5. At the outer upper corner of the piece 5 are downwardly turned hooks 6 and 7 formed by undercut inwardly inclined recesses 8 and 9 leading into and terminating in downwardly and inwardly inclined openings 10 and 11, and providing upwardly extending points 12 and 13. The side edges 14 and 15 of the piece 5 are inclined outwardly from the top to the bottom for engaging the sides of the cup as will be hereinafter described. The upper edge of the piece 5 at its center is preferably cut out or notched at 16 and rounded at 17 and 18, and each side 19 and 20 of the center of said piece is cut out or provided with openings 21 and 22 thereby leaving a vertical central strip 23. The lower edges of the piece 5, indicated by 24, is cut out at its center at 25 similar to 16 and otherwise may be of any suitable contour.

Extending from the cutout openings 21 and 22 of the sides 19 and 20 are vertical slotted recesses 26 and 27 adapted to receive a cross-bar 28 for holding said sides against relative lateral movement when the handle is attached to a cup. The cross-bar 28 is preferably stamped from the part cut out at 22 from the piece 5 but is left supported thereto by means of narrow necks 29 and 30. Recesses 31 and 32 are provided in the cross-bar 28 for receiving the sides of the handle.

The piece 5 is now complete for forming the handle 4 and attaching same to a cup, as will now be described. The cross-bar 28 is separated from the side 20 by breaking at 29 and 30. The sides 19 and 20 are compressed between the thumb and finger to bring their free edges 14 and 15 together in order to apply the hooks 6 and 7 over the rim 3 of the cup and permit said rim to enter the openings 10 and 11. When the sides 19 and 20 are compressed together, the central strip 23 remains at a right angle thereto and the sides 19 and 20 bend at their junctures as indicated at 34. As the piece 5 is resilient material, after application of the hooks 6 and 7 to the cup and upon release of the compressed sides 19 and 20 of the handle, said sides tend to spring apart at their free edges, as shown in Fig. 2, and thereby lock the handle to the cup by the binding action thereof, and the points 12 and 13 engage the underside of the rim of the cup. The edges 13 and 14 of the handle engage the sides 2 of the cup and serve to brace the handle and the cup against lateral movement. To make the handle even more rigid, the cross-bar 28 is applied to the sides thereof by entering the recesses 26 and 27 while its recesses 31 and 32 receive the sides of the handle and provide locking joints.

From the drawing and description, it is seen that this detachable handle is inexpensive to manufacture, may be sold in a flat package, is easily attached to a cup, and will hold the cup securely and rigidly.

Although the handle herein set forth is well adapted to accomplish the intended purpose, it may be changed in detail of construction within the scope of the claims.

Having described my invention, what I claim is:

1. A detchable handle formed from resilient sheet material and having hook shoulders adapted to engage a bead at the top rim of a paper cup and adapted to be bent upon an intermediate line to bring said shoulders substantially together for attachment, the lower portion of said handle sheet being adapted to engage the side of the cup, the resilient action causing the shoulders to separate changing the angular relation between the sheet at either edge with the bead of the cup and causing tight engagement therewith.

2. A frame like member having finger grip openings at opposite sides of a median line and having upwardly and downwardly projecting opposing shoulders adapted to grip the bead of a paper cup, the frame like member being resilient to permit bringing the shoulder portions together to effect engagement with the bead and thereafter to spread, changing the angular relation of the shoulders from a substantially radial position toward a tangential position to effectively grip the bead portion of the cup and the lower portion of the member being adapted to engage the side of the cup.

3. A handle for a paper cup, having a bead at the rim comprising a sheet-like flexible member adapted to be bent on a median line, shoulders at opposite sides of the median line adapted to engage beneath the bead and within the lip of the cup when brought toward each other, tending to separate to tighten the grip of the shoulders onto the cup and at separated points and having openings for finger grip at either side of the median line and an attachable transverse member limiting the separation of the lower edges of the sheet-like member.

4. An attachable handle for a paper cup having a bead at the rim consisting of a sheet-like member having at its upper corners opposing shoulders adapted to grip beneath the bead and inside of the cup, and having finger grip openings at each side of its median line adapted to be compressed at the upper portion to effect engagement and to spread to tighten said engagement at the bead and a cross member having portions engaging the strip at the lower portion to limit separation at the portion of the strip engaging the sides of the cup.

SYDNEY R. KOONS.